United States Patent [19]

Ahagon et al.

[11] Patent Number: 4,635,693

[45] Date of Patent: Jan. 13, 1987

[54] PNEUMATIC TIRE BASE-CAP TREAD

[75] Inventors: Asahiro Ahagon, Fujisawa; Toshio Kobayashi, Kanagawa; Kazuhiro Yamada, Chigasaki; Seiichi Doi, Hadano; Makoto Misawa, Hiratsuka, all of Japan

[73] Assignee: The Yokohama Rubber Co., Ltd., Tokyo, Japan

[21] Appl. No.: 673,348

[22] Filed: Nov. 20, 1984

[30] Foreign Application Priority Data

Nov. 21, 1983 [JP] Japan .................... 58-217839

[51] Int. Cl.$^4$ .................... G60C 11/00; G60C 1/00
[52] U.S. Cl. .................................... 152/209 R
[58] Field of Search ............. 152/209 R, 374, 330 R; 525/236, 237, 232

[56] References Cited

U.S. PATENT DOCUMENTS 4,396,052 8/1983 Ahagon et al. ............... 152/209 R
4,527,606 7/1985 Kita et al. ................... 152/209 R Primary Examiner—Michael Ball
Attorney, Agent, or Firm—Finnegan, Henderson Farabow, Garrett & Dunner

[57] ABSTRACT

A pnuematic tire having a cap tread and a base tread is defined in way of material as follows:

(1) said cap tread is made of a rubber material in which 100 pts. wt. of rubber component comprising at least 50 pts. wt. of natural rubber and/or polyisoprene rubber, at most 50 pts. wt. of polybutadiene rubber containing at most 20% of 1,2-bonding units and at most 50 pts. wt. of styrene-butadiene copolymer rubber containing at most 30 wt % of bonded styrene is incorporated with 50 to 100 pts. wt. of carbon black and with a softener in an amount satisfying the inequality;

$$1.1X - 44 < y < 1.1X - 30,$$

where y is the total amount of the softener in pts. Wt.; x is the amount of carbon black in pts. wt.; and an overall solubility parameter of the softener is in the range of from 8.0 to 9.0, (2) said base tread is made of a rubber material in which 100 pts. wt. of rubber component comprising at least 60 pts. wt. of natural rubber and/or polyisoprene rubber, at most 40 pts. wt. of polybutadiene rubber containing at most 20% of 1,2-bonding units and at most 40 pts. wt. of styrene-butadiene copolymer rubber containing at most 30 wt % of bonded styrene is incorporated with 2.6 to 3.6 pts. wt. of sulfur, and (3) said base tread has a volume fraction of 0.1 to 0.5 against the entire tread part.

7 Claims, 2 Drawing Figures

PNEUMATIC TIRE BASE-CAP TREAD

This invention relates to a pneumatic tire which has superior drivability on snow-covered or frozen road surfaces and is capable of retaining such a superior performance for a long period, and more particularly to a pneumatic tire with a two-layer tread structure in which the tread part is composed of a cap tread having outstandingly improved frictional resistance on the snow-covered or frozen road surface and a base tread allowing the cap tread to retain its superior characteristics for a long time.

Of all road surface conditions on which automobiles run, a frozen road surface is the most slippery and dangerous. In a cold district where automobiles are often obliged to run on the frozen road surface, tires with their tread having studs or chains are widely used. Even in a cold district, however, roads are not always bound with ice in winter; in fact, their surface rather remains unfrozen for most of the winter season. Yet, with the development of automobile traffic today, automobiles have come to be operated frequently with tires having spikes or chains, also, on unfrozen roads, and this has given rise to such social problems that the studs and chains scratch the road surface and the dust generated thereby induce environmental pollution. Enormous cost is required for the repair of the damaged road. As a countermeasure to these problems, there has been a demand for the development of a tire that will require no studs or chains in the driving of automobiles safely even on the frozen road surface. One of the conditions for realizing such a tire is to develop a rubber material capable of providing tread with a sufficient frictional resistance against the frozen road surface.

In providing a tire with an increased frictional resistance against the frozen road surface, it has heretofore been thought important for the tread to be composed of a rubber material which remains soft even at low temperatures. In general, the larger the contact area where two objects are rubbing against each other, the greater the frictional resistance. A soft rubber material, when sliding on the road surface, is deformable in good conformity with very small unevennesses of the road surface, so that it will have a large effective contact area and a high frictional resistance on the road surface. Of course, an automobile with tires having a high frictional resistance is advantageous especially when driving on the frozen road surface.

From this viewpoint, the tread for the so-called snow tire for use in a cold district in winter has been made of natural rubber or polybutadiene rubber which is difficultly stiffened even at low temperatures. Moreover, aromatic process oils have widely been used as a softener, and in some cases process oils having a relatively low aromatic content have been used for the purpose of increasing the frictional resistance against the frozen road surface. The snow tires with their tread made of such a rubber material as mentioned above are being used as tires for the frozen road surface, with their frictional resistance increased by the application of studs or chains. Such being the current situation, there has been a demand for a rubber material for the tread having a higher frictional resistance against the frozen road surface than that of the conventional rubber matierial for the tread, so that it will be possible for an automobile to run safely, without applying studs or chains to its tires, on the frozen road surface.

In order to meet these demands, the present inventors have made ardent studies and have found that a tread rubber material having such a high frictional resistance against the frozen road surface that could never be presumed the from prior art can be obtained by the proper arrangement of the composition of the rubber component, the characteristics of the softener and the amount of its use in a specified range. A tire with a tread made of such a rubber material as prepared above has an excellent drivability on the frozen road surface while it is new, whereas it is defective in that its excellent drivability on the frozen road surface is apt to disappear after long running. This invention relates to a tire capable of exhibiting an excellent drivability on the frozen road surface for a long period, free from the above-mentioned defect.

Thus, an object of this invention is to provide a pneumatic tire which is superior in drivability on the snow-covered or frozen road surface and capable of retaining the superior movement performance for a long period, and the tire manufactured according to this invention can be used advantageously for an automobile tire in winter.

The tire of this invention has a tread part of a two-layer structure composed of a cap tread and a base tread, wherein the cap tread which is to be in contact with the ground plays the role of increasing the drivability on the snow-covered or frozen road surface, and the base tread plays the role of allowing the cap tread to retain its superior drivability for a long period. The tire according to this invention is a pneumatic tire characterized in that (1) said cap tread is made of:
a rubber material in which 100 pts. wt. of rubber component comprising at least 50 pts. wt. of natural rubber and/or polyisoprene rubber, at most 50 pts. wt. of polybutadiene rubber containing at most 20% of 1,2-bonding units and at most 50 pts. wt. of styrene-butadiene copolymer rubber containing at most 30 wt % of bonded styrene is incorporated with 50 to 100 pts. wt. of carbon black and with a softener in an amount satisfying the equation, $1.1x-44<y<1.1x-30$, where y is the total amount of the softener in pts. wt. and x is the amount of carbon black in pts. wt., overall solubility parameter of softener is in the range of from 8.0 to 9.0, (2) said base tread is made of:
a rubber material in which 100 pts. wt. of rubber component comprising at least 60 pts. wt. of natural rubber and/or polyisoprene rubber, at most 40 pts. wt. of polybutadiene rubber containing at most 20% of 1,2-bonding units and at most 40 pts. wt. of styrene-butadiene copolymer rubber containing at most 30 wt % of bonded styrene is incorporated with 2.6 to 3.6 pts. wt. of sulfur, and (3) said base tread has a volume fraction of 0.1 to 0.5 against the entire tread part.

Figure 1:
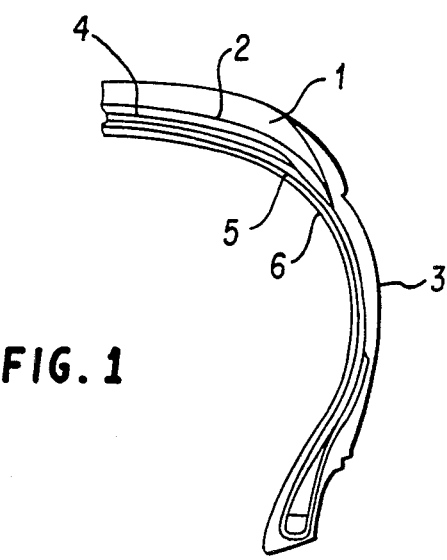
FIG. 1 is a diagram showing a sectional view of the pneumatic tire of this invention.

The pneumatic tire of this invention has a tread part of a two-layer structure composed of a cap tread 1 and a base tread 2 as shown in FIG. 1, where 3 is a side wall, 4 a breaker, 5 a carcass, and 6 an inner liner.

The rubber component, 100 pts. wt. in total, used for the cap tread of the tire of this invention comprises at least 50 pts. wt. of natural rubber (NR) and/or polyisoprene rubber (IR), at most 50 pts. wt. of polybutadiene rubber (BR) containing at most 20% of 1,2-bonding units and at most 50 pts. wt. of styrene-butadiene copolymer rubber (SBR) containing at most 30 wt % of bonded styrene. In order to obtain an increased drivability on the snow-studs or frozen road surface, the content of NR and/or IR must be at least 50 pts. wt: if its content is less than 50 pts. wt., it will be difficult to sufficiently improve the drivability on the snow-studs or frozen road surface. The content of 1,2-bonding units in BR should be at most 20%: if its content exceeds 20%, it will be difficult to elevate the drivability to a high level as required on the snow-covered or frozen road surface. BR is used for improving the drivability on the snow-covered or frozen road surface, and its effect is increased as the temperature is lowered. However, if its content is too high, it would not only bring about an adverse effect when the temperature is in the vicinity of the melting point of ice, but also decrease the drivability on the wet road surface greatly, and therefore its content must not exceed 50 pts. wt. SBR is used, if necessary, for the purpose of improving the drivability on the wet road surface. With the increase in the bonded styrene in SBR, the drivability is increased on the wet road surface but is decreased on the snow-covered or frozen road surface. Thus, in order to confine the drop in the drivability within an allowable range, the content of the bonded styrene in SBR must be limited to at most 30 wt % and, for the same reason, the SBR content be limited to at most 50 pts. wt.

The carbon black to be incorporated in the cap tread of the tire of this invention may be any one that can be used for conventional tire tread material, and its kind need not particularly be limited. The amount of carbon black used for the cap tread of this invention should be 50 to 100 pts. wt. per 100 pts. wt. of the total rubber components. Its amount outside this range is undesirable: if its content is less than 50 pts. wt., the drivability on the wet road surface will be lower than the allowable range, and if its content exceeds 100 pts. wt., there will occur too much heat build up.

The drivability of a tire depends on the frictional resistance of its tread material. The detailed investigation by the present inventors has revealed that besides the above-mentioned rubber components, the selection of a softener and the method of its application are important as the major factors in determining the frictional resistance of rubber material against the snow-covered or frozen road surface.

The softener used for the cap tread of this invention is a member or a mixture of two or more members selected from among process oil obtained by further distilling and extracting heavy residual crude oil obtained in the refining of crude oil, vegetable oils or their derivatives, and synthetic softeners of ester series, epoxy series, phosphate ester series and ether series, and the solubility parameter (SP) of the softener as a whole should be in a range of from 8.0 to 9.0. If the softener is specified by its molecular structure, its SP value can be determined according to Small's method [P. A. Small, J. Appl. Chem., 3(2), 71-80 (1953)]. As for a process oil which cannot be specified by its molecular structure, it has been found during the process of the attainment of this invention that its SP value can be calculated from equation (1).

$$SP \text{ value of process oil} = \frac{\rho(125C_A + 128C_N + 140C_P)}{12.8C_A + 13.8C_N + 14.0C_P} \quad (1)$$

In the above equation, $\rho$ is the specific gravity of the process oil, and $C_A$, $C_N$ and $C_P$ are percentages of the aromatic carbon atoms, naphthenic carbon atoms and paraffinic carbon atoms, respectively, contained in the process oil. The overall SP value of a mixed softener consisting of two or more softeners can be calculated from equation (2).

$$\text{Overall } SP \text{ value of a mixed softener} = \quad (2)$$
$$\phi_1 \, (SP \text{ value of softener 1}) + \phi_2 \, (SP \text{ value of softener 2}) +$$
$$\phi_3 \, (SP \text{ value of softener 3}) + \ldots$$

In the above equation, $\phi_1$, $\phi_2$, $\phi_3$—are the volume fractions of the softeners 1, 2, 3—, respectively.

The frictional resistance against the snow-covered or frozen road surface depends greatly on the overall SP value obtained as above of all the softeners contained in the rubber material rather than on the chemical structure of the softener: With the decrease in the overall SP value of the softener, the frictional resistance against the frozen road surface tends to increase. This tendency is remarkable especially when the overall SP value is 9.0 or lower. When the overall SP value exceeds 9.0, the frictional resistance against the snow-clad or frozen road surface will be on a low level, showing very little change with the change in SP value. In order to elevate the drivability of a tire on the snow-covered or frozen road surface, therefore, the overall SP value of the softener used must be at most 9.0. On the other hand, if the softener has a too small SP value, it will have a decreased compatibility with the rubber component and is liable to bleed, and therefore its SP value must be controlled to 8.0 at the lowest. Furthermore, if the softener has a too high viscosity, the frictional resistance against the snow-covered or frozen road surface tends to decrease, and therefore it is desirable that the viscosity of each softener used for the cap tread of the tire of this invention is at most 100 cP at 20° C. The softener can be incorporated easily in the rubber component if the process oil as its ingredient is previously incorporated as a extender oil in the rubber component in the process of preparing the raw polymer.

The amount of the softener used should be chosen in such a range that its effect can be exhibited to the full. The appropriate range of its use depends on the amount of carbon black used. The total amount of the softener used for the cap tread of the tires of this invention, y(pts. wt.), must be in a range satisfying the following inequality, where x is the amount of carbon black, in pts. wt.

$$1.1x - 44 < y < 1.1x - 30 \quad (3)$$

With the increase in the amount of the softener used, the frictional resistance against the snow-covered or frozen road surface tends to increase, and this tendency is remarkable especially when the amount of the softener, y, is in a range satisfying the inequality (3). When the amount of the softener used is in a range of less than $(1.1x-44)$ pts. wt., the frictional resistance against the snow-covered or frozen road surface cannot satisfactorily be increased even if its amount is increased when its amount is in range of more than (1.1x−30) pts. wt., its effect reaches nearly maximum, and a further increase in its amount would unfavorably invite the lowering of abrasion resistance and other harms.

As described above, the tire according to this invention is provided with a cap tread containing a relatively large amount of a specified softener for the purpose of increasing its drivability on the snow-covered or frozen road surface. However, the tire with such a cap tread has high build-up and its liable to deterioration, and yet the softener is apt to migrate from the cap tread to inner material layers, so that it is difficult for the tire to retain its superior drivability on the snow-covered or frozen road surface for a long period. In order to overcome this difficulty, it is effective to couple the above-mentioned cap tread with a base tread having a specified compostion.

The base tread for the tire of this invention is made of a rubber component comprising at least 60 pts. wt. of NR and/or IR, at most 40 pts. wt. of BR containing at most 20% of 1,2-bonding units and at most 40 pts. wt. of SBR containing at most 30 wt % of bonded styrene. On driving with this tire, its rubber material is heated and its temperature rises. The greater the temperature rise due to the heat generated in the tread part, the more the rubber material in the cap tread is liable to be stiffened by oxidation, and the more the softener is liable to be evaporated or migrate to other constituent materials, so that the cap tread is lowered in its drivability on the snow-covered or frozen road surface. Therefore, it is important to minimize the heat generation in the tread part. For this purpose, it is effective to use a base tread made of rubber material with reduced heat generation, such as NR and BR. However, when the tread part is damaged by external scratches such as cuts, a tread separation may be induced if the base tread has insufficient strength. To prevent this, it is desirable for the base tread to be composed of NR having a high strength in an amount of 60 pts. wt. or more and BR having a low strength in an amount of 40 pts. wt. or less. Furthermore, to improve the roll processability in tire production, SBR containing at most 30 wt % of bonded styrene should be used in an amount of at most 40 pts. wt. The bonded styrene content exceeding 30 wt % and SBR in an amount exceeding 40 pts. wt. are both undesirable, because a tire is thereby excessively heated while driving.

The base tread for the tire of this invention is made of rubber material comprising 100 pts. wt. of the above-mentioned rubber component incorporated with 2.6 to 3.6 pts. wt. of sulfur as a vulcanizer. The rubber material containing less than 2.6 pts. wt. of sulfur as the vulcanizer cannot exhibit a sufficient effect of inhibiting the lowering of the drivability during driving on the snow-covered or frozen road surface; on the other hand, if the sulfur content exceeds 3.6 pts. wt., the base tread is unfavorably decreased in strength.

The tire according to this invention has such a tread structure that the base tread is arranged all over the braker side of the cap tread, and the base tread has a volume fraction of 0.1 to 0.5 against the entire tread part. The volume fraction of the base tread of less than 0.1 causes large heat generation and is therefore undesirable. On the other hand, its volume fraction exceeding 0.5 is also undesirable, because it becomes difficult to provide the tread pattern having grooves of a sufficient depth which is important for the drivability on the snow-covered road surface.

The effects of this invention will now be explained by experimental examples, examples and comparative examples. In Tables 3 and 4, the amounts of ingredients are shown by pts. wt.

EXPERIMENTAL EXAMPLE 1

The ingredients of the rubber material used for the cap tread are shown in Table 1, and the softeners used and their properties in Table 2.

TABLE 1

| | |
|---|---|
| rubber component | 100 pts. wt. |
| zinc oxide | 5 pts. wt. |
| stearic acid | 3 pts. wt. |
| antioxidant[1] | 3 pts. wt. |
| wax | 1 pt. wt. |
| softener[2] | varied amount |
| carbon black[3] | varied amount |
| sulfur | 2 pts. wt. |
| vulcanization accelerator[4] | 1.2 pts. wt. |

Note:
[1]N—1,3-dimethylbutyl-N'—phenyl-p-phenylenediamine
[2]See Table 2
[3]ASTM designation: N 220
[4]N—oxydiethylene-benzothiazyl-2-sulfenamide

TABLE 2

| Softener No. | Softener | Specific gravity at 20° C. | Viscosity at 20° C. (cp) | $C_A$ (%) | $C_N$ (%) | $C_P$ (%) | SP value |
|---|---|---|---|---|---|---|---|
| 1 | aromatic process oil | 1.00 | 30 | 43 | 28 | 29 | 9.70 |
| 2 | paraffinic process oil | 0.87 | 260 | 0 | 29 | 71 | 8.52 |
| 3 | paraffinic process oil | 0.86 | 52 | 4 | 28 | 68 | 8.42 |
| 4 | paraffinic process oil | 0.90 | 51 | 19 | 20 | 61 | 8.83 |
| 5 | di-2-ethylhexyl phthalate | 0.99 | 77 | — | — | — | 8.94 |
| 6 | di-2-ethylhexyl sebacate | 0.92 | 22 | — | — | — | 8.58 |
| 7 | di(butoxy-ethoxy-ethyl) formal | 0.96 | 10 | — | — | — | 8.12 |

Rubber compositions for a cap tread were prepared according to the conventional method, by incorporating the rubber component containing carbon black and softeners in amounts and kinds shown in Table 3 with the ingredients shown in Table 1, and were vulcanized at 160° for 15 minutes. Samples obtained thereby were tested for skid resistance on the frozen road surface at a surface temperature of −8° C., using a British Portable Skid Tester. Measurements were made in accordance with ASTM E-303. The sample was set to a temperature of 20° C. in consideration of heat generated in the tire while driving. The calculated values of the overall SP of all the softeners contained in the rubber material and the observed values of skid resistance are shown by indices, assuming the value for Composition Example 1 as 100, in Table 3. The greater the skid resistance, the higher the frictional resistance, so that a cap tread material having more excellent movement drivability can be obtained.

TABLE 3

| Composition | Composition Example No. | | | | | | | | | |
|---|---|---|---|---|---|---|---|---|---|---|
| | 1 | 2 | 3 | 4 | 5 | 6 | 7 | 8 | 9 | 10 |
| NR[5] | 70 | 70 | 70 | 70 | 70 | 70 | 70 | 70 | 70 | 70 |
| BR[6] | 41.25 | 41.25 | 41.25 | 41.25 | 41.25 | 41.25 | 41.25 | 41.25 | 41.25 | 41.25 |
| carbon black | 70 | 70 | 70 | 70 | 70 | 70 | 70 | 70 | 70 | 70 |
| softener 1 | 30 | | | | | | | | | |
| softener 2 | | 30 | | | | | | | | |
| softener 3 | | | 30 | | | | | | | |
| softener 4 | | | | 30 | | 15 | | 15 | | 15 |
| softener 5 | | | | | 30 | 15 | | | | |
| softener 6 | | | | | | | 30 | 15 | | |
| softener 7 | | | | | | | | | 30 | 15 |
| Total amount of softeners | 41.25 | 41.25 | 41.25 | 41.25 | 41.25 | 41.25 | 41.25 | 41.25 | 41.25 | 41.25 |
| Overall SP value of softeners | 9.70 | 8.81 | 8.73 | 9.05 | 9.15 | 9.10 | 8.87 | 8.96 | 8.54 | 8.80 |
| Properties Skid resistance index on frozen road surface | 100 | 105 | 118 | 104 | 103 | 106 | 115 | 110 | 125 | 116 |

Note:
[5]RSS#3,
[6]Nipol BR 1441, a product of Nippon Zeon Co., Ltd.: Oil-extended BR containing 37.5 pts. wt. of softener 1, an aromatic process oil, per 100 pts. wt. of BR (41.25 pts. wt. of Nipol BR 1441 contains 30 pts. wt. of BR as the rubber material and 11.25 pts. wt. of softener 1.)

Figure 2:
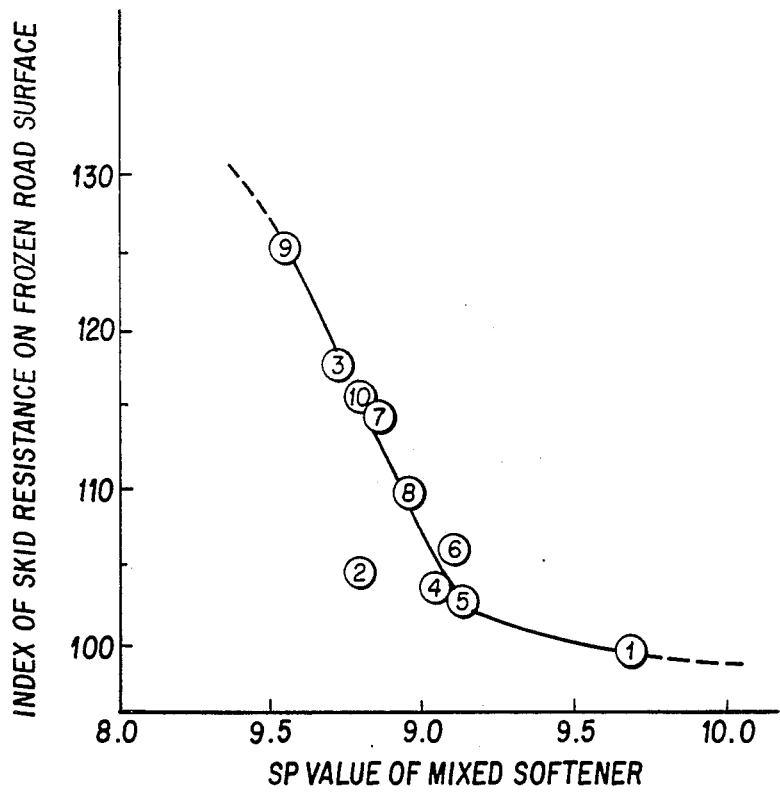
FIG. 2 is a graph showing the relation between the solubility parameter of the mixed softener used for the rubber material (Composition Examples 1 to 10) for the cap tread and the skid resistance on the frozen road surface.

FIG. 2 is a diagram in which the skid resistance index observed on the frozen road surface in Table 3 is plotted against the overall SP value of all the softeners contained in the rubber material, wherein the numeral on each dot shows Composition Example No. in Table 3. It is evident that the drivability (skid resistance) of the rubber material of a cap tread on the frozen road surface depents greatly on the overall SP value of all the softeners contained in the material, regardless of process oils and synthetic softeners used. With the decrease in the SP value of the softener, the drivability of the rubber material on the frozen road surface is improved. In the region where the SP value exceeds 9.0, however, the drivability is improved very little. To realize a marked improvement in the drivability on the frozen road surface, therefore, the overall SP value of all the softeners contained must be arranged to 9.0 or lower. In some cases, as in Composition Example 2, the drivability on the frozen road surface may be improved very little even when the SP value is lower than 9.0. This is because the softener 2 has an outstandingly high viscosity (Table 2). It is desirable that the viscosity of the softener be 100 cP or lower at 20° C.

EXPERIMENTAL EXAMPLE 2

Rubber materials were prepared by incorporating rubber component containing carbon black in amounts of 55 and 80 pts. wt. with softeners in varied amounts. The samples obtained thereby were investigated for the influence of the softener content on the skid resistance on the frozen road surface. The skid resistance indices of the rubber materials on the frozen road surfaces are shown in Table 4 (carbon black content of 55 pts. wt.) and Table 5 (carbon black content of 80 pts. wt.). The values of skid resistance on the frozen road surface shown in Tables 4 and 5 are represented by their indices, assuming the values for Composition Examples 11 and 16, respectively, as 100. The methods employed herein for the preparation of rubber materials, vulcanization, and measurement of skid resistance were the same as in Experimental Example 1.

When the carbon black content is fixed and the softener content increased, the movement performance (skid resistance) on the frozen road surface tends to be improved, whereas the improvement behavior is rather complicated as seen evidently in Tables 4 and 5: The effect of an increase in the softener content is remarkable only when its content is within a certain range, while such a positive effect is not or scarcely recognized in other cases. The amount of the softener contained in the rubber material for the cap tread of the tire of this invention is in a range of from more than 16.5 pts. wt. to less than 30.5 pts. wt. in case the carbon black content is 55 pts. wt., or in a range from more than 44 pts. wt. to less than 58 pts. wt. in case the carbon black content is 80 pts. wt., and it is evident from Tables 4 and 5 that the effect of the softener on the improvement of the drivability on the frozen road surface is very great as far as the carbon black content is within these ranges.

TABLE 4

| Composition | Composition Example No. | | | | |
|---|---|---|---|---|---|
| | 11 | 12 | 13 | 14 | 15 |
| NR[5] | 70 | 70 | 70 | 70 | 70 |
| BR[7] | 30 | 30 | 30 | 30 | 30 |
| carbon black | 55 | 55 | 55 | 55 | 55 |
| softener 4 | 7.5 | 15 | 22.5 | 30 | 37.5 |
| Properties Skid resistance index on frozen road surface | 100 | 104 | 125 | 138 | 138 |

[7]Nippol BR 1220, a product of Nippon Zeon Co., Ltd.

TABLE 5

| Composition | Composition Example No. | | | | |
|---|---|---|---|---|---|
| | 16 | 17 | 18 | 19 | 20 |
| NR[5] | 70 | 70 | 70 | 70 | 70 |
| BR[7] | 30 | 30 | 30 | 30 | 30 |
| carbon black | 80 | 80 | 80 | 80 | 80 |
| softener 4 | 35 | 42.5 | 50 | 57.5 | 60 |
| Properties Skid resistance index on frozen road surface | 100 | 103 | 120 | 135 | 137 |

EXAMPLE 1 AND COMPARATIVE EXAMPLES 1 AND 2

Steel radial tires (165 SR 13) provided with a cap tread made of the rubber materials of Composition Examples 1 and 9 were compared for drivability on the frozen road surface. The sample tires had a tread part composed of a cap tread and a base tread in a two-layer structure wherein the base tread had a volume fraction of 0.2 against the entire tread part. The base tread was made of a rubber material comprising 70 pts. wt. of NR (RSS #3), 30 pts. wt. of SBR (Tufdene 1000R, a product of Asahi Chemical Industry Co., Ltd.; bonded styrene content of 18 wt %), 3 pts. wt. of zinc oxide, 1 pt. wt. of stearic acid, 50 pts. wt. of carbon black (ASTM designation: N 550), 5 pts. wt. of an aromatic process oil, 1.2 pts. wt. of a vulcanization accelerator (N-oxydiethylene-benzothiazyl-2-sulfenamide) and 2.2 or 3.0 pts. wt. of sulfur.

The drivability on the frozen road surface was tested with new tires and used ones which had been driven 5,000 km on paved roads, by observing their braking distance starting with an initial speed of 30 km/hr on the frozen road surface. The results are shown in Table 6.

The braking performance on the frozen road surface was represented by the index assuming the initial braking distance for tire A (Comparative Example) as 100. The greater the index, the higher the braking performance.

TABLE 6

| Example/Comparative Example No. | Comparative Example 1 | Comparative Example 2 | Example 1 |
|---|---|---|---|
| Tire | A | B | C |
| Composition of cap tread material | Composition Example 1 | Composition Example 9 | Composition Example 9 |
| Sulfur incorporated in base tread (pts. wt.) | 2.2 | 2.2 | 3.0 |
| Braking performance (new tire) on frozen road surface | 100 | 110 | 110 |
| Braking performance (tire after 5,000 km drive) on frozen road surface | 96 | 102 | 106 |

Tire A (Comparative Example 1) was provided with a cap tread incorporated with 70 pts. wt. of carbon black and 41.25 pts. wt. of an aromatic process oil having an SP value of 9.70 as a softener in a relatively greater amount and a base tread containing 2.2 pts. wt. of sulfur. Tire B (Comparative Example 2) had the same specification as tire A, except that the softener used was a mixed softener having an SP value of 8.54. Tire B, being provided with a cap tread containing a softener with a decreased SP value, was superior to tire A in drivability on the frozen road surface. While travelling, however, the difference in drivability between tires A and B on the frozen road surface became small. The cap tread containing a softener with a smaller SP value was effective in increasing the movement performance of the tire on the frozen road surface, whereas the tire had its drivability decreased while being used, that is, its superiority in drivability was diminished while it was used.

Tire C (Example 1) was made of the same cap tread material as tire B, and its base tread material had an increased sulfur content of 3.0 pts. wt. As its base tread material had an increased sulfur content, not only tire C could exhibit a drivability as excellent as tire B while it was new, but also its performance was very little decreased by its use. Thus, the tire of this invention has proved to be a tire having a high reliability and capable of retaining its excellent drivability on the frozen road surface for a long period.

The constitution of this invention and its effects have now been described by the embodiments of the method for improving the cap tread in movement performance on the snow-covered or frozen road surface by adopting a rubber composition effecting an excellent drivability on the snow-covered or frozen road surface and the method for enabling the tire with such an improved cap tread to retain its excellent drivability on the snow-covered or frozen road surface, as shown in Experimental Examples 1 and 2, Example 1 and Comparative Examples 1 and 2. The above embodiments have made clear that the pneumatic tire of this invention, wherein the cap tread is improved in drivability on the snow-covered or frozen road surface by the combined use of rubber conponent effecting an excellent drivability on the snow-covered or frozen road surface, softener characteristics which have heretofore been neglected, and the quantities of their application, and wherein the cap tread thus improved is coupled with a base tread having a specified rubber composition and a specified sulfur content, is far more improved, than with the conventional tire, in drivability on the snow-covered or frozen road surface and yet capable of retaining its excellent performance for a long period.

The embodiments of the invention in which an exclusive property or privilege is claimed are defined as follows:

1. A pneumatic tire having a rubber cap tread and a rubber base tread, said cap tread is made of a rubber comprising per 100 pts. by wt. at least 50 pts. wt. of at least one rubber selected from the group consisting of natural rubber and polyisoprene rubber, 50 pts. wt. max. of polybutadiene rubber containing 20% max. of 1,2-bonding units and 50 pts. wt. max. of styrene-butadiene copolymer rubber containing 30 wt.% max. of bonded styrene with 50 to 100 pts. wt. of carbon black and with a softener in an amount of;

$$1.1X - 44 < y < 1.1X - 30,$$

where y is the total amount of the softener in pts. wt.; x is the amount of carbon black in pts. wt.; and said softener having a solubility parameter of from 8.0 to 9.0, said base tread is made of a rubber comprising per 100 pts. by wt. at least 60 pts. wt. of at least one rubber selected from the group consisting of natural and polyisoprene rubber, 40 pts. wt. max. of polybutadiene rubber containing 20% max. of 1,2-bonding units and 40 pts. wt. max. of styrene-butadiene copolymer rubber containing 30 wt% max. of bonded styrene with 2.6 to 3.6 pts. wt. of sulfur, and said base tread having a volume fraction of 0.1 to 0.5 relative to total volume of said base tread and said cap tread.

2. The tire of claim 1 wherein said softener comprises at least one material selected from the group consisting of process oil obtained by further distilling and extracting heavy residual crude oil obtained in the refining of crude oil, vegetable oils, vegetable oil derivatives and synthetic softeners of ester series, epoxy series, phosphate ester series and ether series.

3. The tire of claim 1 wherein said softener comprises an aromatic process oil.

4. The tire of claim 1 wherein said softener comprises paraffinic process oil.

5. The tire of claim 1 wherein said softener comprises di-2-ethylhexyl phthalate.

6. The tire of claim 1 wherein said softener comprises di-2-ethylhexyl sebacate.

7. The tire of claim 1 wherein said softener comprises di(butoxy-ethoxyethyl) formal.

* * * * *